(12) United States Patent
Bennett

(10) Patent No.: US 6,414,790 B1
(45) Date of Patent: Jul. 2, 2002

(54) POLARIZED NON-ROTATING VARIABLE LIGHT TRANSMITTING WINDOW

(76) Inventor: Stewart Bennett, 133 Annorsmac Hill Rd., Concord, MA (US) 01742

( * ) Notice: Subject to any disclaimer, the term of this patent is extended or adjusted under 35 U.S.C. 154(b) by 0 days.

(21) Appl. No.: 09/450,605

(22) Filed: Nov. 30, 1999

(51) Int. Cl.⁷ .............................. G02B 5/30; G02B 27/28
(52) U.S. Cl. ...................... 359/485; 359/489; 359/490; 359/491; 359/501
(58) Field of Search ................................ 359/485, 489, 359/490, 491, 501

(56) References Cited

U.S. PATENT DOCUMENTS

| | | | |
|---|---|---|---|
| 2,260,220 A | * 10/1941 | Grabau | |
| 2,281,112 A | * 4/1942 | Ryan | |
| 2,617,329 A | * 11/1952 | Dreyer | ........................ 359/501 |
| 3,504,962 A | * 4/1970 | Shanley | |
| 4,123,141 A | * 10/1978 | Schuler | ........................ 359/501 |
| 4,285,577 A | * 8/1981 | Schuler | ........................ 359/501 |
| 4,893,908 A | * 1/1990 | Wolf et al. | |
| 4,902,112 A | * 2/1990 | Lowe | ........................ 359/501 |
| 5,033,829 A | * 7/1991 | Faroughy | ........................ 359/501 |
| 5,164,856 A | * 11/1992 | Zhang et al. | ............... 359/489 |
| 5,189,552 A | * 2/1993 | Metwalli | ..................... 359/501 |
| 5,940,216 A | * 8/1999 | Gibbs | ........................ 359/489 |

* cited by examiner

Primary Examiner—Ricky D. Shafer

(57) ABSTRACT

A window whose light transmission can be mechanically controlled and varied smoothly from a high value of approximately 40% to a low value of approximately 1% is achieved without the requirement of rotation. Polarizing molecules are coated onto four different surfaces in particular patterns. When the coated panels are assembled in the disclosed manner light transmission can be modified with only small translational movements. Durability benefits are also achieved, as well as the potential for lowered heat transmission.

8 Claims, 4 Drawing Sheets

POLARIZED NON-ROTATING VARIABLE LIGHT TRANSMITTING WINDOW

BACKGROUND OF THE INVENTION

Light polarizing materials are presently used to control the light transmission of certain windows. By constructing a window of two parallel panels, and covering each panel with a layer of linear polarizing material, light transmission control can be achieved by rotating one of the panels with respect to the other. When the polarization axes of the two panels are parallel to one another the transmission of the pair can be of the order of 40%; when one panel is rotated by 90 degrees so that the polarization axes of the panels are perpendicular to one another the transmission is reduced to the order of 1%. The variation between these two values is smooth as the rotation is accomplished, so that intermediate rotation amounts produce intermediate light transmissions. The practical problem with this arrangement is that nearly all windows used in homes and offices are rectangular in outline; rotating one panel with respect to another is awkward and requires a great deal of inefficiently utilized space for the corners of the windows.

U.S. Pat. No. 2,617,329 of John F. Dreyer describes an improvement where the polarizers in the panels are not uniformly oriented, but patterned in a particular way. This eliminates the need for rotation; the relative motion necessary to change the transmission of the window is translational. However, the pattern Dreyer requires causes manufacturing problems which are described below, and which result in local non-uniformities in transmission.

Here we describe a method of producing windows whose transmission can be varied smoothly and continuously over a wide range, remains uniform over the entire window aperture at all times, and does not require rotation. The polarization pattern proposed by Dreyer is modified significantly to permit manufacture without giving up any benefits.

SUMMARY OF THE INVENTION

The present invention provides a window made up of two parallel panels. Each panel carries linear light polarizing material. The orientation of the polarizing directions is not uniform over the panels; rather, it is at a particular angular value at each location on a panel. The variation of polarizing direction is smooth in some areas of the panel and discontinuous at other locations. The particular recipe for polarization angle as a function of location allows continuous variation of the light transmission of the pair of panels without requiring rotation of one panel with respect to the other. Instead a small translational movement is all that is required.

Since each panel carries polarizing material at every location in the window aperture, and since the angular orientation required does not vary smoothly over the entire window aperture, the polarizing materials are applied to more than one surface for each panel. These surfaces are then combined to form the complete polarized panel. Additional benefits are obtained by this method of construction: (A) improvements are found in durability of the polarizing materials because the act of combining elements to form a single panel permits sealing off the polarizing zones from ambient humidity; and, (B) evacuating the sealed regions permits the panels to reduce heat transmission just as in Thermopane windows.

DETAILED DESCRIPTION OF THE INVENTION

Figure 1:
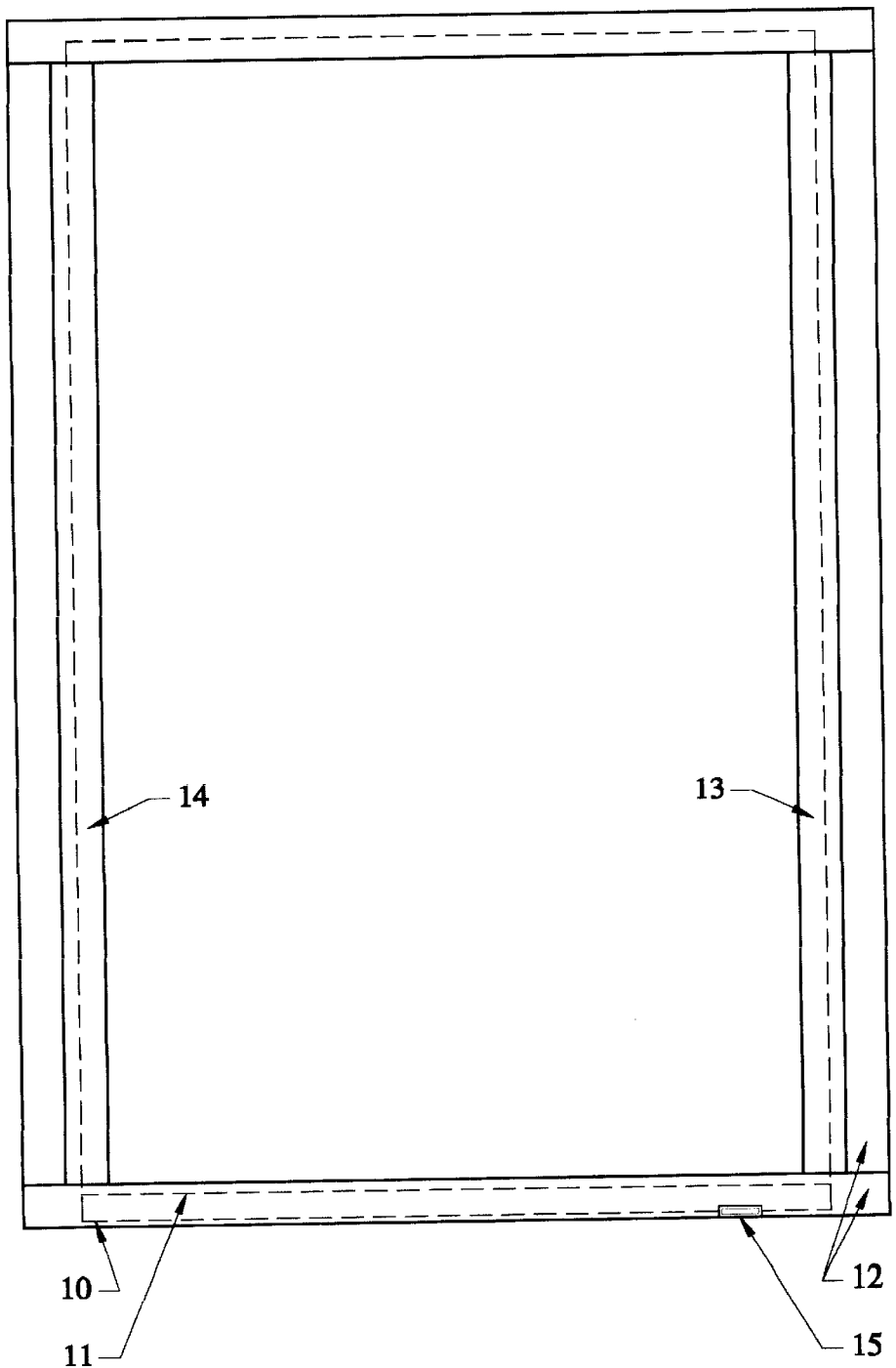
FIGS. 1 and 2 are, respectively, front and side views of a variable light transmission window (VLT) made up of two panel assemblies co-mounted in a frame.
Figure 2:
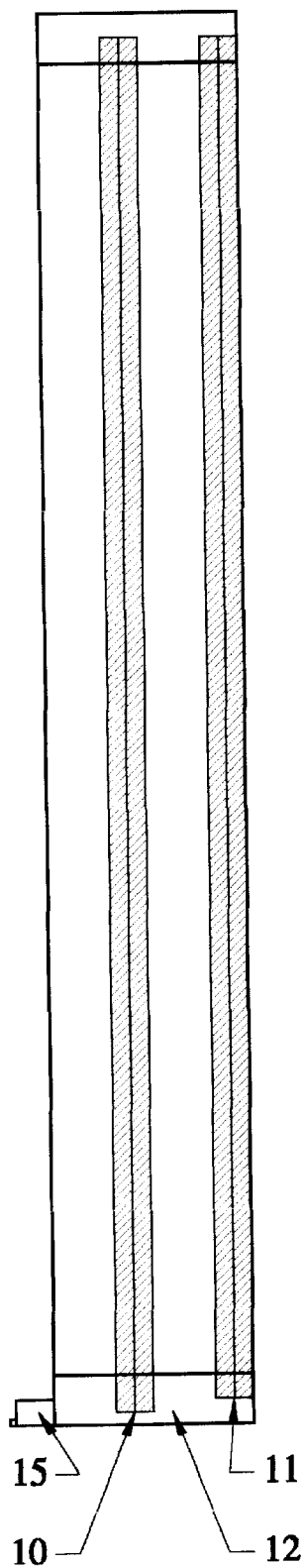

FIGS. 1 and 2 show a variable light transmitting window (VLT) made up of two panels (10 and 11) co-mounted in a frame (12). The panels are parallel, one in front of the other, so that the observer looks through both panels to see through the window. The interior panel (10) is slightly wider than the exterior panel (11) and slightly taller. Opaque guard strips (13 and 14) are configured as part of the frame and they obscure the vertical edges of panels 10 and 11. Thus, the panel 10 can be moved, to a limited extent, in a horizontal direction while the frame and panel 11 remain stationary. The guard strips 13 and 14 make this movement less noticeable. The lever which permits control of the movement is 15. The mechanisms which relate the movement of the lever 15 to the movement of the panel 10 are routine alignments of gears and are not detailed in this description of the VLT window. It is only necessary that the amount of movement which can be achieved is of the order of a centimeter, that the movement be smooth, that smaller amounts of panel movement can be achieved by smaller lever movements, and that the parallelism of the panels is not disturbed by the movement.

Figure 3:
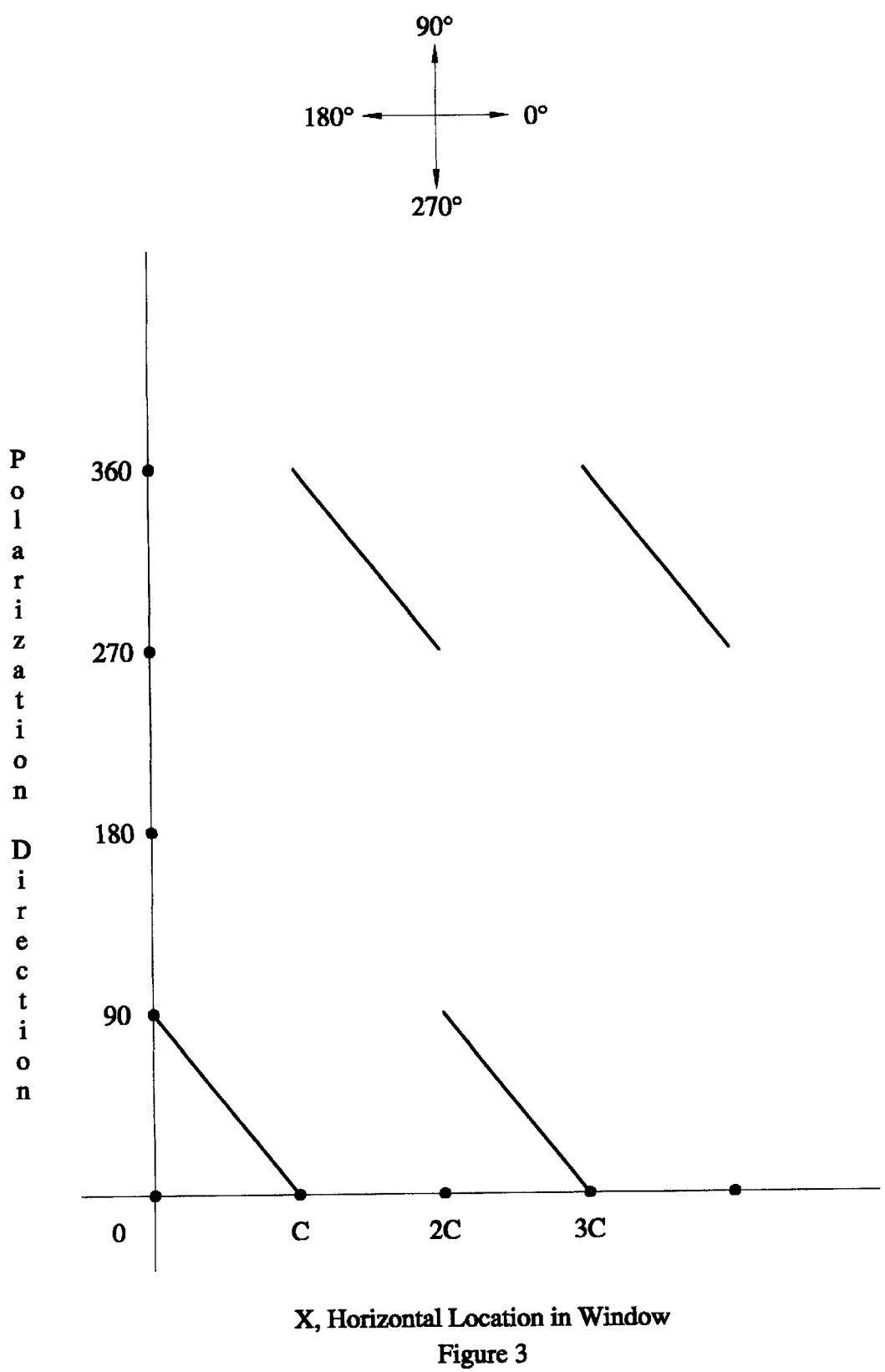
FIG. 3 shows the patterns of polarization in the two panel assemblies.
Figure 4:
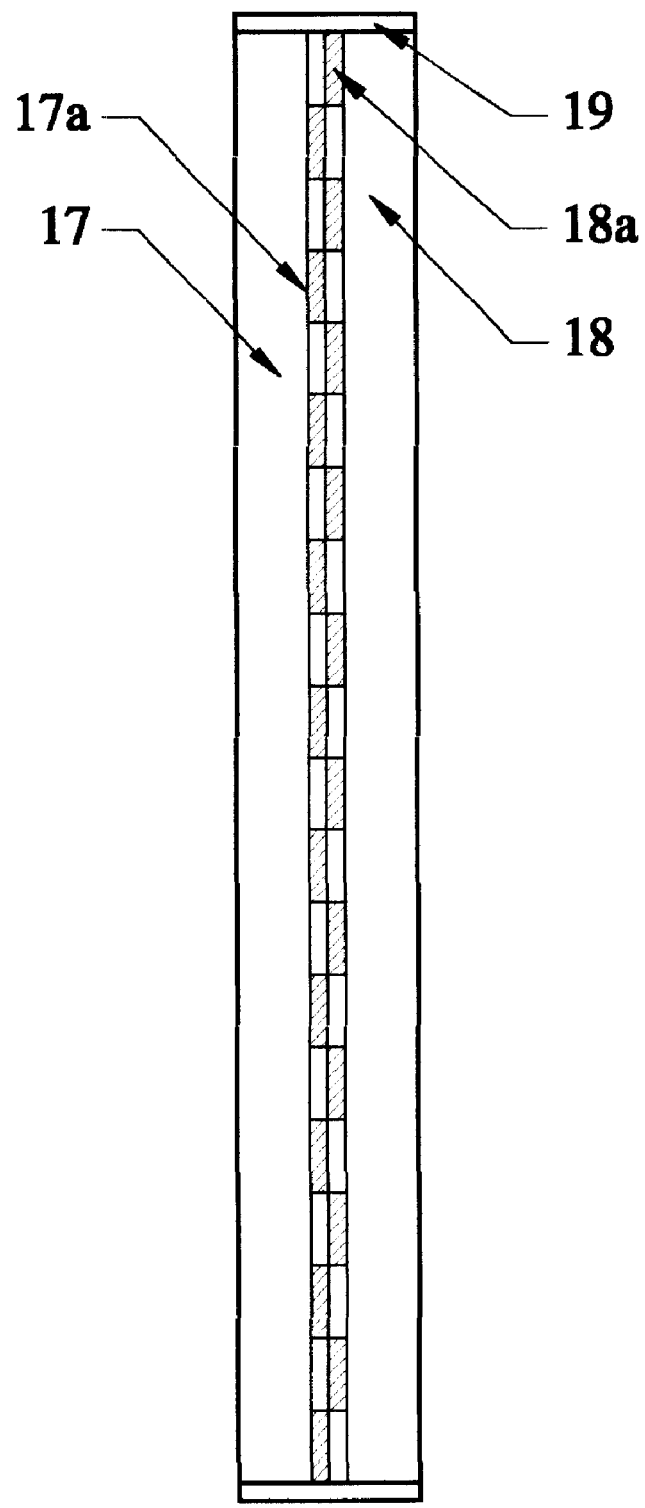
FIG. 4 is a view of a panel assembly from above, showing the organization of the clear zones and polarized zones of each panel.

FIG. 3 shows the patterns of polarization in the two panels, the interior panel and the exterior panel. The patterns are similar, consisting of parallel vertical stripes. Within each stripe the direction of polarization is given by equation (1):

$$\theta = 90°(1-x/c) \qquad (1)$$

where $\theta$ is the angle of polarization, x is the distance from the left hand edge of a stripe, and c is one half of the width of a stripe. When the polarization direction is parallel to the stripe direction and pointed up (in FIG. 3) the polarization angle is defined as 90°, and when the direction is horizontal and to the right in FIG. 3 the angle is defined as 0°.

It is readily seen that the polarization angle changes in direct proportion to distance from the left edge of a stripe. The stripe width is 2c, so that at the right edge of a stripe the polarization direction is −90°, or 270°, as calculated from Equation (1).

Because the polarization angle changes in direct proportion to horizontal distance over the whole stripe, when two panels bearing these stripes are placed in parallel and translated with respect to one another in a direction perpendicular to the stripe direction, the window light transmission varies continuously, smoothly, and uniformly over the window, from a maximum value when the stripes on the two panels are in perfect alignment to a minimum transmission when one panel has been translated relative to the other by a distance of c/2.

A major concern for a window prepared to this prescription for polarization directions is at the boundary between stripes. As can be seen from Equation (1), at the left hand edge of a stripe the polarization angle is 90° while at the right hand edge it is −90°. This requires an abrupt discontinuity in polarization direction (a 180° shift) at each boundary between two stripes. Since the methods of orienting the polarizing molecules generally involve coating a liquid, orienting the molecules in the liquid by coating dynamics or by the use of external forces (such as electric and/or magnetic fields) and having the liquid dry out while the achieved orientation is maintained, it is difficult to visualize how to accomplish the 180° shift in polarization direction at the stripe boundary. If it is not achieved the optical performance at the boundary will be degraded, and the resulting window will appear to have optical non-uniformities at distances of c. Since the translation required to make the windows function as desired is c/2 it is preferred that c be a small distance; thus, optical non-uniformities with a period of c are likely to be objectionable.

To circumvent this difficulty each panel is made up of two subpanels (17 and 18) as shown in FIG. (4), which is a view of the panel from above. Each subpanel is coated with polarizers in stripes (17a and 18a) oriented as in Equation (1). However, each subpanel carrieonly one half of the stripes needed in the assembled panel. One subpanel (18) carries the odd numbered stripes and the other (17) the even numbered stripes. In the one subpanel the spaces between the odd numbered stripes are left uncoated, while in the other subpanel the spaces between the even numbered stripes are left uncoated. The complete panel is then assembled by joining the two subpanels together. The stripes in each subpanel line up with the uncoated spaces in the other subpanel.

The assembly of the subpanels is done so that all of the polarizing molecules are on the inside of the laminated structure. This puts all of the polarizing molecules in the same plane, which is optically desirable; further the polarizing molecules are protected from the extend environment (especially if a properly formulated seal (19) is placed along the edges of the assembled panel) and this is an additional benefit in terms of window durability.

What is claimed is:

1. A window structure, comprising a first panel of glass or non-birefringent plastic, carrying parallel strips of equal width of light polarizing molecules, the polarizing molecules oriented so that the polarization direction in each strip varies linearly from 90 degrees at one edge of the strip to −90 degrees at the other edge of the strip, the polarizing strips being separated from each other by clear strips, said clear strips each having a width equal to the width of the polarizing strips;

a second panel of glass or non-birefringent plastic, carrying parralled strips of equal width of light polarizing molecules, the polarizing molecules oriented so that the polazization direction in each strip varies linearly from 90 degrees at one end of the strip to −90 degrees at the other edge of the strip, the polarizing strips being separated from each other by clear strips, said clear strips having a width equal to the width of the polarizing strips; the second panel is attached to the first panel so that the polarizing and clear strips of the second panel are parallel to the polarizing and clear strips of the first panel and aligned so that the polarizing strips of each panel line up with the clear strips of the other panel to serve as a first assembly, and all of the polarizing and clear strips of the first and second panels are located in the interior of the first assembly;

a third panel of glass or non-birefringent plastic, carrying parallel strips of equal width of light polarizing molecules, the polarizing molecules oriented so that the polarization direction in each strip varies linearly from 90 degrees at one edge of the strip to −90 degrees at the other edge of the strip, the polarizing strips being separated from each other by clear strips, said clear strips each having a width equal to the width of the polarizing strips;

a fourth panel of glass or non-birefringent plastic, carrying parallel strips of equal width of light polarizing molecules, the polarizing molecules oriented so that the polarization direction in each strip varies linearly from 90 degrees at one edge of the strip to −90 degrees at the other edge of the strip, the polarizing strips being separated from each other by clear strips, said clear strips each having a width equal to the width of the polarizing strips; the fourth panel is attached to the third panel so that the polarizing and clear strips of the fourth panel are parallel to the polarizing and clear strips of the third panel and aligned so that the polarizing strips of each panel line up with the clear strips of the other panel to serve as a second assembly, and all of the polarizing strips and clear strips of the third and fourth panels are located in the interior of the second assembly;

a frame in which the first assembly is held in a fixed position and the second assembly is held so that a translational movement of the second assembly relative to the first assembly can be achieved, in a direction which causes the polarizing directions at each location in the second assembly to vary from parallel to perpendicular to the polarization directions of the adjacent locations in the first assembly as the translational movement is carried out.

2. A window structure of claim 1 wherein the edges of the first assembly and of the second assembly are sealed to protect the polarizing molecules from ambient environmental conditions.

3. A window structure of claim 2 wherein the first and second panels which make up the first assembly are separated from one another by a gap which is evacuated before the first assembly is sealed.

4. A window structure of claim 3 wherein the light polarizing molecules are dye molecules oriented during a lyotropic liquid crystal phase by shear forces applied during coating.

5. A window structure of claim 2 wherein the third and fourth panels which make up the second assembly are separated from one another by a gap which is evacuated before the second assembly is sealed.

6. A window structure of claim 5 wherein the light polarizing molecules are dye molecules oriented during a lyotropic liquid crystal phase by shear forces applied during coating.

7. A window structure of claim 2 wherein the light poling molecules are dye molecules oriented during a lyotropic liquid crystal phase by shear forces applied during coating.

8. A window structure of claim 1 wherein the light polarizing molecules are dye molecules oriented during a lyotropic liquid crystal phase by shear forces applied during coating.

* * * * *